March 12, 1935.  E. H. CURTIS, JR  1,994,123
ADJUSTABLE MOUNTING FOR SHEARS OF A GLASS FEEDER
Filed Nov. 18, 1931   2 Sheets-Sheet 1
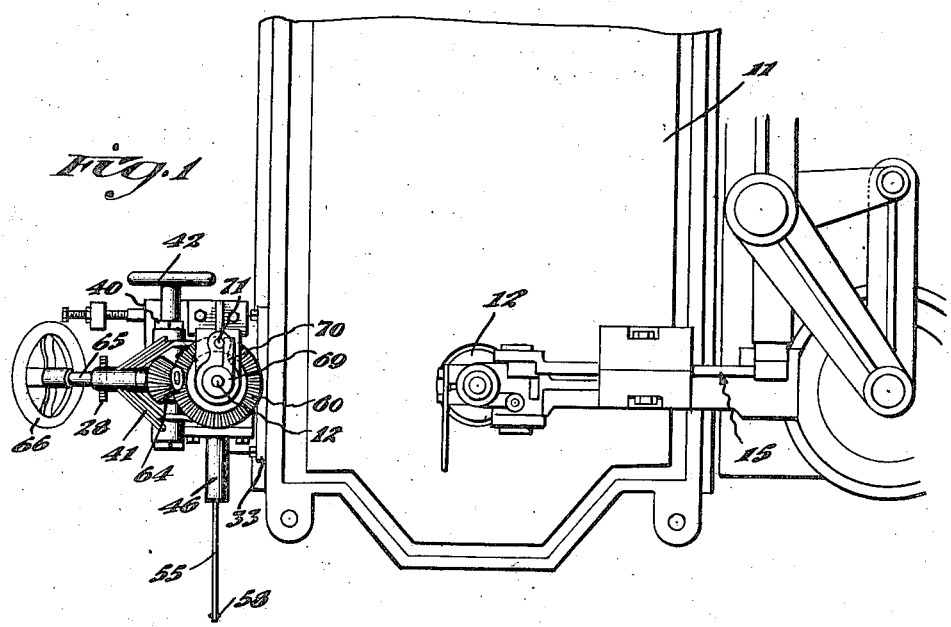
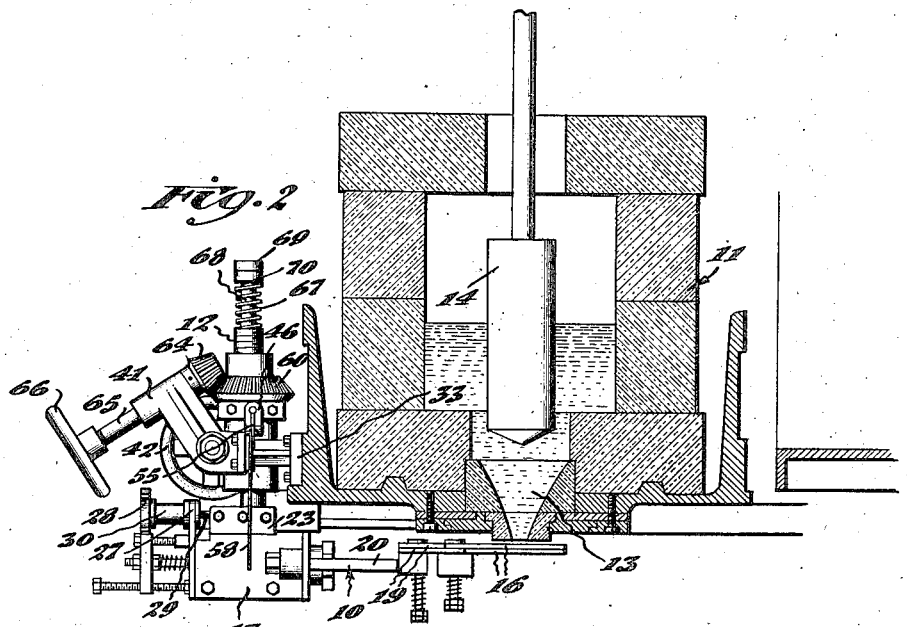
INVENTOR
Edwin H. Curtis, Jr.
BY
Wood & Wood
ATTORNEY

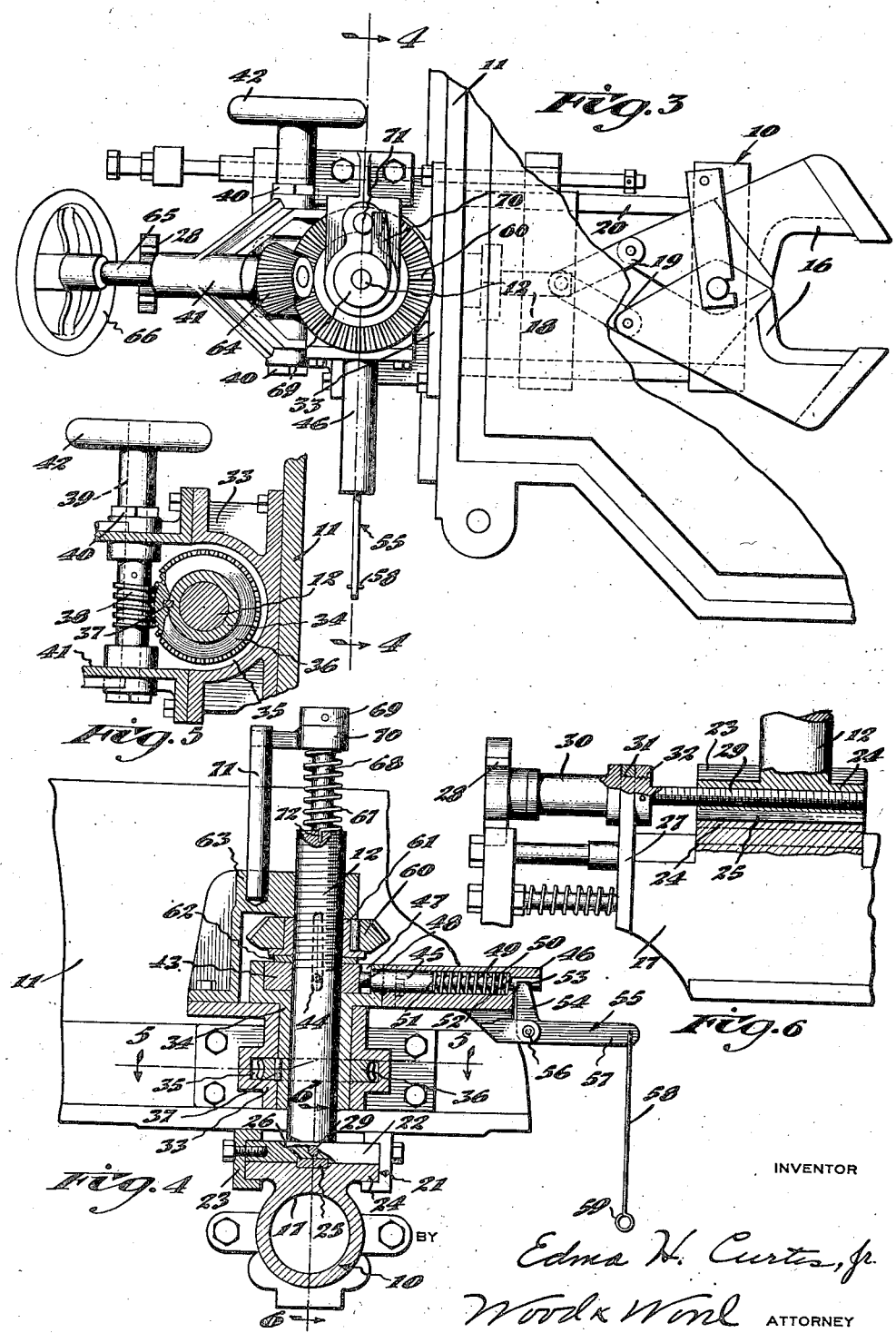

Patented Mar. 12, 1935

1,994,123

UNITED STATES PATENT OFFICE 1,994,123

ADJUSTABLE MOUNTING FOR SHEARS OF A GLASS FEEDER

Edma H. Curtis, Jr., Cincinnati, Ohio, assignor, by mesne assignments, to Hartford-Empire Company, Hartford, Conn., a corporation of Delaware Application November 18, 1931, Serial No. 575,851

10 Claims. (Cl. 49—55)

This invention relates to the glass feeding mechanism of a glass furnace and is particularly directed to improvements in the mounting of the shears which are used for severing the gobs of glass fed from the furnace. The shears are disposed beneath a discharge orifice of the molten glass container and are operated at timed intervals for severing the depending gobs of glass which have been forced through the orifice by a plunger or other means operating in synchronism with the shears.

It is an object of this invention to provide an improved adjustable mounting for the shears wherein universal adjustment is possible for varying the position of the shears beneath the orifice relative to the gobs of glass fed therefrom, which adjustments may be made while the machine is being operated. The improved adjustment features preferably include devices for varying the elevation of the shears and a device or devices for adjusting the shears in a horizontal plane in all directions laterally of the axis of the orifice.

It is another object of this invention to provide a mounting for the shear unit which permits complete displacement of the shears from the region below the orifice, through which means the shears may be moved out beyond the glass feeder tank, as is desirable in case of replacement or repair, and may readily be swung back to the same position occupied prior to complete displacement, this being a particular advantage in that a set adjustment having been obtained, it may be re-established easily and accurately after the repairs or replacement.

A still further object relates to improvements in the adjustment means for stabilizing the shears in any adjusted position and efficiently preventing any accidental displacement of the shears after a careful adjustment has been made.

Other objects and certain advantages will be more fully apparent from a description of the accompanying drawings, in which:

Figure 1 is a fragmentary top plan view illustrating the improved glass feeding apparatus at the snout or discharge end of the molten glass container.

Figure 2 is a view showing the molten glass container in section and illustrating the shear mounting and adjusting unit attached in position relative to the discharge orifice of the glass furnace.

Figure 3 is an enlarged fragmentary top plan view at that portion of the glass feeder adjacent the shears for further illustrating the construction of the shear unit and its mounting.

Figure 4 is a sectional view taken on line 4—4, Figure 3, detailing the various adjustment means incorporated in the shear unit and mounting.

Figure 5 is a sectional view taken on line 5—5, Figure 4, illustrating the adjustment mechanism for rotative adjustment of the shears on the mounting.

Figure 6 is a view taken on line 6—6, Figure 4, detailing the adjustment means for lineal horizontal adjustment of the shears.

The shear assembly 10, including its actuating means, is hung from an adjustment apparatus as a part of the shear unit, this adjustment apparatus being bolted to the snout 11 of the molten glass tank of the glass furnace. The various adjustments are effected on a large stud 12 extended from the shear operating unit upwardly through the mounting and adjusting apparatus for supporting the shear operating unit, there being three types of adjustment afforded through this apparatus. One adjustment is effective for varying the elevation of the shears relative to the orifice 13 of the glass feeder. Another is effective for revolving the shear operating assembly and the shears in a vertical plane on the stud thereby adjusting the position of the shears laterally relative to the orifice. The third adjustment which is contained with the hung shear operating assembly mechanism consists of a means for direct lineal vertical adjustment of the shears beneath the orifice, toward and from the axis thereof. The adjustment of the shears is universal through these three adjustments and its position may be accurately varied to any point beneath the discharge orifice and the plunger of the glass feeder.

The details of the plunger are not fully illustrated herein since it forms no part of this invention, the plunger being shown merely for the purpose of providing the invention with a conventional environment. The plunger is generally indicated at 14 and depends into the glass container from an actuating mechanism 15 shown in Figure 1 attached to and disposed above the snout of the glass furnace.

The particular structure of the shear operating mechanism is not disclosed in the present case, the illustration as to the shear operating mechanism merely depicting the blades 16 of shears, a cylinder 17, and a plunger 18 connecting the piston of the cylinder (not shown) to the respective blades of the shear by means of respective links 19. The shear blades are supported on a framework 20 extended out from the cylinder and are suitably pivoted thereon for the appropriate shearing movement.

The cylinder 17 or body of the shear operating assembly is mounted in a guideway or channel 21 formed at the lower end of the large supporting or mounting stud 12 upon which the shear assembly is suspended. The supporting stud includes a rectangular plate 22 at its base and channel rails 23 are bolted to opposite side edges of the plate with their channels disposed inwardly and opposingly. The channel rails 23 are of a sufficient vertical dimension to afford sliding clearance for a plate 24 cast with the cylinder at its upper side and slidably disposed in the slot or channel 21 afforded by the clearance. The cylinder is further guided relative to the plate by means of a key or feather 25 disposed between these parts within respective grooves 26 thereof.

At the outer end of the cylinder an upper extension 27 functions as a mounting for a hand wheel 28, this hand wheel including a stud 29 screwed into the rectangular base of the main supporting stud. The hand wheel (see Figure 6) includes a hub 30 having a shoulder formed by a counterturned portion 31 extended through the extension of the cylinder. A nut 32 is screwed onto the counterturned portion and is pinned in place against the opposite side of the extension 27 for preventing longitudinal displacement of the hand wheel. Therefore, as the hand wheel is rotated, the stud moves in or out of the base of the main supporting stud and carries the cylinder with it, the cylinder sliding in its supporting groove. This arrangement accomplishes the horizontal lineal adjustment of the shears in a direction which is substantially radially of the axis of the glass feeder orifice.

The main supporting stud 12 is mounted within a bracket 33 attached by bolts to the side of the glass container 11. A headed sleeve 34 is supported within the bracket 33 and about the supporting stud 12. The supporting bracket 33 is suitably recessed as at 35 for housing a worm wheel 36, the worm wheel being keyed to the headed sleeve as at 37 for rotative connection thereto. A worm 38 is mounted on an operating shaft 39 journalled by means of bushings 40 within a bracket 41 bolted to the main supporting bracket 33. The end of the operating shaft has a hand wheel 42 pinned thereto through which the operator may rotate the worm 38 and consequently the worm wheel 36 with which it is in mesh thereby rotating the headed sleeve 34.

The headed sleeve is normally connected to the main supporting stud 12 through a collar 43 which is recessed within the head and splined to the supporting stud as at 44. A detachable clutch connection between the collar 43 and the headed sleeve 34 is provided consisting of a manually translatable detent 45 mounted in a casing or bracket 46 bolted to the side of the headed sleeve 34. A notch 47 is included in the periphery of the collar 43 for cooperation with a counterturned tip 48 on the detent. The detent 45 is constantly urged toward the collar 43 by means of a spring 49 under compression about an outer counterturned extension 50 of the detent between a shoulder 51 thereof and the inner end 52 of the bore housing the detent. The detent extension protrudes from the detent bracket 46 and a transverse notch 53 is cut in its under side, this notch being engaged by the rounded end of an arm 54 of a bell crank lever 55 fulcrumed on the detent bracket as at 56. The operating arm 57 of the bell crank lever carries a depending rod 58 having a grip 59 at its lower end.

Through the described means, the detent may be readily extracted from engagement with the notch 47 and the shear operating assembly swung at will about the axis of the main supporting stud and the headed sleeve, it being understood that the splined collar cooperates with an upwardly facing shoulder on the sleeve 34 and with certain hereinafter particularly pointed out elements on the stud 12 to prevent unintended vertical displacement of the shear assembly. This full release for the shear assembly so that it may be swung at will is for the purpose of replacement of the shears or for any repair work on the shear assembly, it being possible to swing the shears from under the glass feeder tank for convenient access thereto. The hand wheel 42 having worm and worm wheel connection to the headed sleeve 34 provides for minute rotative adjustment of the shears for lateral setting thereof beneath the feed orifice when the detent has been slipped into registry with the slot and the headed sleeve and collar are locked together.

The vertical adjustment for the stud 12 and shear assembly involves a beveled gear 60 keyed to a nut 61 and the nut in screw-threaded engagement about the screw-threaded upper end of the support stud 12. This nut is confined against movement longitudinally of the stud 12 by means of a thrust washer 62 thereunder lying upon the top surface of the collar 43 and a bracket 63 bolted to the main bracket and engaging the upper surface of the nut. The bevel gear 60 is operated by means of a bevel gear 64 supported in the hand wheel bracket 63 upon an operating shaft 65, the outer end of which shaft carries an appropriate hand wheel 66.

For the purpose of stabilizing the rotative adjustments and insuring the steadiness of the shears in any adjusted position, a coil spring 67 is used at the top of the stud. In this assembly the stud 12 includes a counterturned upper end 68 which is not screw-threaded and a collar 69 attached to the extreme upper end of the extension or counterturned portion. The coil spring 67 is disposed about the extension between the shoulder, afforded by the counterturning of the stud, and the underside of the hub of an arm 70 abutting the head or collar 69 of the extension. This arm cooperates with a vertically mounted post or abutment pin 71 attached in the bracket or framework of the mounting and arranged to interrupt rotative swing of the arm 70. The respective ends of the spring are extended longitudinally forming tangs 72 anchored in bores in the stud and arm respectively.

Due to the anchoring of the respective ends of the spring, a rotative tension or winding action is involved when the arm is fully engaged against the abutment pin 71. The arm and spring are arranged relative to the stud 12 so that when the shear assembly has been swung under the glass feeding orifice into an approximate position for coupling of the collar 43 and headed sleeve 34, the arm 70 has previously engaged the abutment pin 71 and placed rotative tension in the spring. It will be apparent that upon any rotative adjustment of the shears on the support post 12 through the appropriate adjustment means in either direction within certain ranges the arm 70 will continue to lie against the pin through the action of the spring and a certain spring resistance will be maintained or set up against movement of the stud which is effective for the above mentioned stabilizing action.

Through the described apparatus an extremely accurate adjustment of the shears relative to the feed orifice may be obtained which is highly essential for insuring perfect and even severing of the gobs of glass. The delicate setting of the shears is maintained against accidental displacement as might result from the vibration of the machine or other causes, through the medium of the stabilizing spring. Complete release of the shear assembly for readily moving the same to a point for convenient access is possible. Moreover a fixed adjustment may readily be reassumed after full release since the adjusting devices are not disturbed by full release.

Having described my invention, I claim:

1. In a glass feeder including the molten glass tank having a discharge orifice and the gob shearing unit, a supporting stud for the gob shearing unit, means for supporting said stud, a sleeve mounted in said means, a hand wheel and gear transmission for rotating said sleeve, a clutch for connecting said sleeve to said stud, and means for manually operating said clutch whereby the stud may be rotated by means of the sleeve rotating means or may be swung freely independently of the sleeve and its operating means.

2. In a glass feeder including gob feeding means and shears mounted relative thereto, a rotative mounting for the shears, means for rotatively adjusting the shears in the mounting, and a spring effective for imparting rotative force to the shears, said force being insufficient for imparting movement to said shears in normal positions of use, whereby adjustment is stabilized in any position.

3. In a glass feeder including a glass tank having a discharge orifice, a shear unit mounted relative to said orifice, an overhead mounting adjustably supporting said shear unit, and adjustment means for moving said shear unit laterally beneath said orifice, said adjustment means being fully releasable for permitting complete displacement of said shear unit from beneath said orifice.

4. In a glass feeder including a tank having a discharge orifice therein, a shear unit, an overhead mounting for rotatively supporting said shear unit in position for horizontal swing beneath and laterally relative to said orifice, adjustment means for elevating said shear unit in said mounting, and adjustment means for horizontal adjustment of said shear unit relative to the axis of the orifice.

5. In a glass feeder, including the shears and a glass tank having an orifice; an overhead rotative mounting for the shears, means for rotating said shears in said mounting, a device for vertically adjusting said shears, and a spring mounted for imparting a rotative force to the shears and thereby adapted to rotatively stabilize said shears in positions of rotative adjustment.

6. Adjusting mechanism for the shears of a glass feeder, including the shear unit and its operating means; comprising, a stud extended from said shear unit for supporting the same, a mounting for said stud, means for manually rotating said stud, a nut and screw mechanism for elevating said stud, a spring connected to said stud, and means for maintaining a rotative force in said spring whereby the rotative adjustment of the stud is stabilized.

7. In a shear adjusting apparatus for a glass feeder, a shear unit including shear operating means, a stud having a means slidably supporting said shear unit, means for manually adjusting said shear unit in its slidable support, a support for said stud, means for rotating said stud in said support, and means for elevating said stud in said support.

8. A shear unit adapted to be used for severing gobs of glass fed through an orifice in a glass feeder, comprising, a stud support for the shear unit, a frame for supporting said stud, means for manually rotating said stud and shear unit for changing the position of said shears relative to said orifice; an abutment, an arm normally engageable with said abutment, said arm rotatively mounted on said stud, and a spring having its ends anchored to the arm and the stud respectively whereby a rotative force is normally applied to said stud for stabilizing the stud and shears in adjusted position.

9. A shear unit adapted to be used for severing gobs of glass fed through an orifice in a glass feeder, comprising, a stud support for the shear unit, a frame for hanging said stud, a rotatable sleeve mounted in said frame, a means for manually rotating said sleeve, a disc splined to said stud, a detent mounted in the upper end of said sleeve, said disc including a groove in its periphery engageable by said detent, and means for operating said detent, whereby the shear unit may be rotated and its position changed relative to the orifice either delicately and adjustably through the manual means for rotating the sleeve or fully by directly rotating the shear unit and its stud in the mounting.

10. In a glass feeder including a tank having a discharge orifice therein, a shear unit mounted relative to said orifice, an overhead mount for adjustably supporting said shear unit in position for swinging movement relative to the axis of said orifice and beneath said orifice, adjustment means for adjusting said shear unit laterally relative to the axis of the orifice, means for releasing said adjustment for full swing of said shear unit away from the region of the orifice, and means for adjusting said shear unit substantially at right angles to said swinging adjustment.

EDMA H. CURTIS, Jr.